United States Patent [19]
Eigruber

[11] Patent Number: 5,350,231
[45] Date of Patent: Sep. 27, 1994

[54] DOUBLE WORM EXTRUDER WITH MESHING SCREWS

[75] Inventor: Horst Eigruber, McPherson, Kans.

[73] Assignee: Friedrich Theysohn GmbH, Bad Oeynhausen, Fed. Rep. of Germany

[21] Appl. No.: 143,826

[22] Filed: Oct. 27, 1993

[30] Foreign Application Priority Data

Oct. 29, 1992 [DE] Fed. Rep. of Germany ....... 4236496

[51] Int. Cl.$^5$ .............................................. B01F 7/08
[52] U.S. Cl. ...................................... 366/85; 366/301; 425/204; 425/209
[58] Field of Search ................ 366/85, 84, 83, 96, 366/97, 301, 300, 297, 318; 415/209, 204

[56] References Cited

U.S. PATENT DOCUMENTS

| | | | |
|---|---|---|---|
| 2,048,286 | 7/1936 | Pease | 366/85 |
| 3,114,171 | 12/1963 | Colombo | 366/85 |
| 4,818,206 | 4/1989 | Maillefer | 425/204 |
| 4,913,641 | 4/1990 | Zahradnik | 425/204 |

FOREIGN PATENT DOCUMENTS

3140188 4/1983 Fed. Rep. of Germany .

*Primary Examiner*—Robert W. Jenkins
*Attorney, Agent, or Firm*—Herbert Dubno

[57] ABSTRACT

A double worm extruder has the ribs of its screws of trapezoidal cross section between divergent flanks to minimize wear of the housing surface.

3 Claims, 1 Drawing Sheet

DOUBLE WORM EXTRUDER WITH MESHING SCREWS

FIELD OF THE INVENTION

The present invention relates to a double worm extruder, especially for the plastification and extrusion of thermoplastic materials and, more particularly, to a double worm extruder in which the flights or ribs of the parallel screws interengage or mesh with one another.

BACKGROUND OF THE INVENTION

As will be apparent from German Patent 31 40 188, a double worm extruder can comprise an elongated worm housing in which two mutually meshing worms or screws can be disposed next to one another in respective mutually intersecting cylinder bores so that the interior of the housing has an open figure-eight cross section. The screws can be considered to have elongated screw bodies on which the respective helicals rib, flight or thread is formed, the rib of one screw engaging in the gaps between the terms of the rib of the other screw and vice versa to form a meshing relationship between the screws where the bores overlap or intersect.

The thermoplastic material which is supplied in solid form at one end of the housing to the chamber formed by the intersecting bores, is subjected to high shear forces as the material is displaced by the screws which can be rotated by a motor and gearing at the aforementioned end of the housing in which the screws are journalled. The shear applied to the thermoplastic material can be generated between the meshing parts of the screws as they are rotated in opposite senses and between the screws and the stationary walls of the respective bores and frictionally generates hear in the material to be plastified. Additional heat can be generated by the compression of this material and, if desired, the screws or the housing can be additionally heated.

As a result, the thermoplastic material is thoroughly mixed and melted, i.e. plastified, so that at the opposite end of the double worm extruder, a liquefied product emerges.

The liquefied product may be shaped at this other end of the housing, e.g. in an extrusion die, to form a continuous shaped strand of the thermoplastic material, or it can be fed to an injection unit for producing injection molded articles, or it can be used to produce parisons or some other form of the thermoplastic material enabling it to be blown into blow molded articles or blown into a film. The extruded product can be outputted through a wide-slit nozzle or fed between rolls to produce sheets or films if desired.

Thus the double screw extruder can be utilized as the plastifying device for extrusion presses, injection molding machines and like equipment for the shaping of thermoplastics. For the purpose of the present description, the double worm extruder may be simply referred to as an "extruder" regardless of the shaping ultimately carried out of the plastified material.

An extruder of the type with which the invention is concerned thus can be utilized in all fields in the shaping of plastics and of elastomers such as rubber. It can be used wherever such materials must be plastified with or without additional heat.

The double worm extruders have a significant advantage over single worm extruders in that the outputted material is more homogeneous and uniform.

As noted, the opening through which the material is dispensed in the extruder has a figure-eight cross section, i.e. the bores for the two worms laterally intersect. The bores can be cylindrical and continuous of uniform diameter, although they also can be conical. The screws, correspondingly, can be either cylindrical or conical to conform to the bores.

Since the screws rotate in the housing and the gap or clearance in the screws and the housing must be relatively small, a high squeeze-out pressure of the plastified material can be generated. To minimize wear, the inner surface of the housing and the outer surface of the screws, especially the surfaces of the ribs, can be coated with wear resistant coatings.

Nevertheless, in spite of the presence of such coatings, it has been found that the wear of the inner surface of the housing especially is high with conventional double worm extruders like the extruder described in German Patent 31 40 188.

Indeed, the housing must be resurfaced even after relatively short periods of time. It has been found that the wear is especially pronounced where the plastified material is forced at especially high pressures from gaps between the two screws against the surfaces of the housing.

OBJECTS OF THE INVENTION

It is therefore an object of the present invention to provide a double worm extruder such that the wear between worms or screws and the worm housing is reduced.

Another object of the invention is to provide an improved double worm extruder whereby the aforementioned drawback is reduced or obviated.

Still another object of the invention is to provide an improved double worm extruder which requires less repair and maintenance than conventional or prior art double worm extruders.

SUMMARY OF THE INVENTION

These objects and others which will become apparent hereinafter are attained, in accordance with the invention by providing a double worm extruder in which the meshing ribs of the screws have trapezoidal cross sections defined between flanks of the ribs which diverge from one another outwardly.

More particularly, the extruder of the invention can comprise:

an elongated worm housing having a pair of adjacent laterally overlapping bores extending longitudinally in the housing and defining an open figure-eight cross section therein; and a respective screw received in each of the bores, the screws being journalled in the housing and having longitudinally extending bodies formed with helical ribs projecting therefrom, the ribs of the screws meshing with one another, the ribs each being of trapezoidal cross section between outwardly diverging flanks.

The trapezoidal shape of the ribs such that they widen outwardly, provide forces in operation of the extruder which are in part turned inwardly, thereby reducing the outward pressure with which the plastified material is directed against the inner surface of the housing.

Indeed, where the flanks of two meshing ribs overlap, the forces applied to the material do not act outwardly at least with the force which has hitherto resulted in the increased wear of the housing. Rather, the outer surface of the ribs can be enlarged as a consequence of the trapezoidal configuration to increase the bearing capacity of the outer surface of the ribs and to provide greater bearing films of the molten material between the worms and the housing which reduce wear. The life of the extruder before it requires maintenance or repair is thereby increased.

BRIEF DESCRIPTION OF THE DRAWING

The above and other objects, features and advantages of the invention will become more readily apparent from the following description, reference being made to the accompanying highly diagrammatic drawing in which.

SPECIFIC DESCRIPTION

Figure 1:
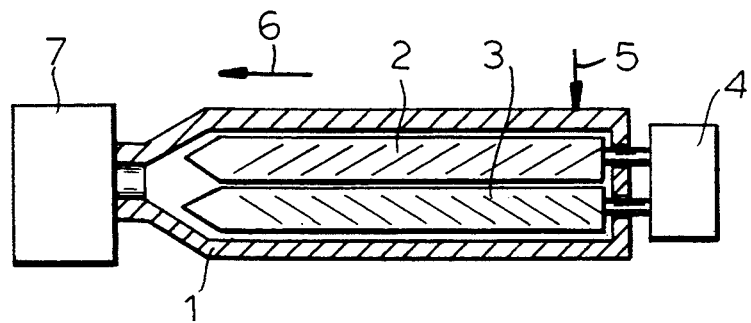
FIG. 1 is a diagrammatic cross sectional view through an extruder according to the invention.

The extruder shown in the drawing comprises a housing 1 having two intersecting bores disposed adjacent one another and of cylindrical configuration. It will be understood that these bores can be conical in which case the screws will also be conical and converge, e.g., from right to left. Two screws 2 and 3 are disposed within the bores and each screw is comprised of a longitudinal body from which a helical rib 10, 11 projects. Where the bores intersect, the ribs of the two screws mesh. The ribs of the two screws 2 and 3 are shown by inclined lines in FIG. 1.

In operation of the extruder, the screws 2 and 3 are driven about their respective axes, e.g. in opposite senses, by a drive unit represented at 4.

The material to be plastified, referred to herein generally as plastic, is fed to the extruder at the right hand end as represented by the arrow 5 and may be a thermoplastic material which is thermoplastified in the extruder and is forced in the direction of arrow 6 to a shaping unit represented at 7. The unit 7 may be an extrusion die which produces a continuous profiled strand of the plastic.

Figure 2:
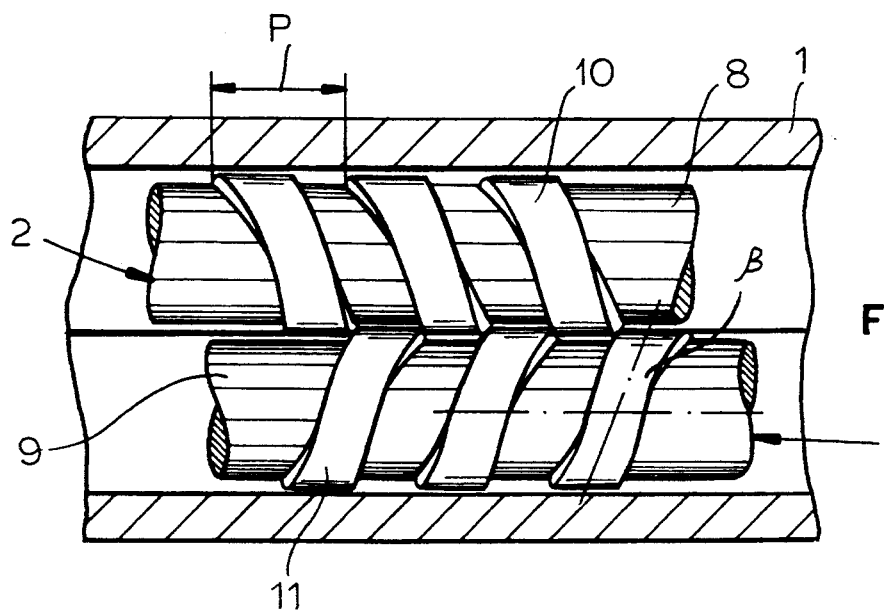
FIG. 2 is a detail of the extruder drawn to a larger scale.
Figure 3:
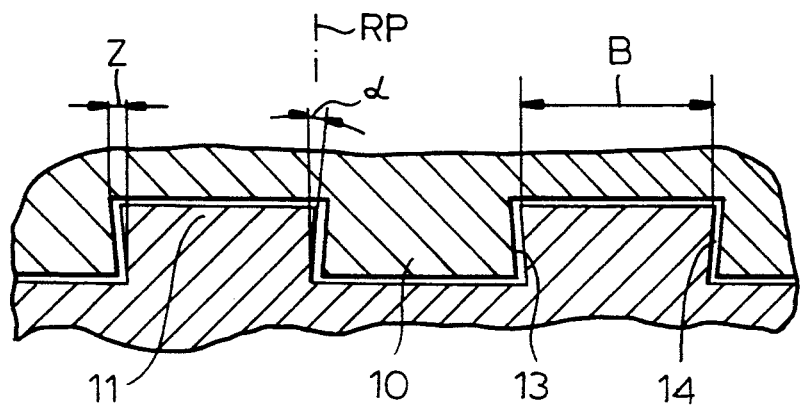
FIG. 3 is a cross sectional view showing the meshing region of the screws enlarged to a still greater scale.
Figure 4:
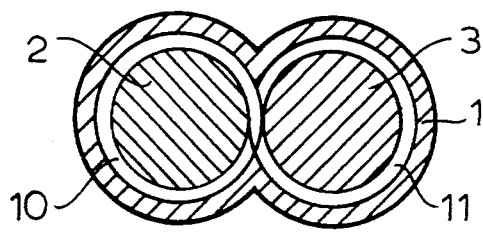
FIG. 4 is a transverse section through the extruder showing the FIG. 8 configuration of the intersecting bores.

The construction of the screws 2 and 3 will be more readily apparent from the enlarged views of FIGS. 2 and 3.

The screws 2 and 3 thus have cylindrical bodies 8 and 9 from which the helical ribs 10 and 11 project outwardly. The outer surfaces of these ribs are cylindrical and are separated only by thin films of the thermoplastified material from the inner surfaces of the extruder housing 1. As can be seen from FIG. 3, the worms 2 and 3 lie so close to one another that their ribs 10 and 11 interengage. Thus the turns of the rib 10 engage in the spaces between the turns of the rib 11, and vice versa.

The plastic to be worked in the extruder is forced in the direction 6 toward the shaping tool 7 (FIG. 1) by the rotation of the worms and passes in part through the gap between the worms and into the clearances between the worms 2 and 3 and the housing 1. The plastic between the worms 2 and 3 is subjected to a substantial pressure and in part is directed outwardly. By imparting a trapezoidal cross section to the ribs 10 and 11 so that the flanks 13 and 14, for example, diverge outwardly, in the overlapping region of the ribs 10 and 11 at the zone Z, this pressure is applied at least partly inwardly, rather than outwardly, and thus the total outward pressure can be reduced and the wear of the inner surface of the housing 1 likewise reduced without substantial reduction in the throughput.

The width B of the ribs 10 and 11 and hence the external surfaces of the ribs can be increased with the trapezoidal ribs of the invention over other rib shapes so that the film of the molten plastic on this surface between the screw and the inner surface of the housing can be greater to thereby support the screw and lubricate the region between the screw and the housing and further reduce the wear of the housing. The life of the housing is therefore significantly increased.

The angle $\alpha$ between the inclined flanks 13, 14 and the radial plane RP should not exceed 5° although it preferably is greater than 1°. In any case, however, the angle must be such that to insure that the ribs 10 and 11 can interfit without binding. The pitch of the ribs represented at P is the same for both screws and both screws here have the same pitch angle $\beta$ as well.

I claim:

1. A double-worm extruder, comprising:
    an elongated worm housing having a pair of adjacent laterally overlapping bores extending longitudinally in said housing and defining an open figure-eight cross section therein; and
    a respective screw received in each of said bores, said screws being journalled in said housing and having longitudinally extending bodies formed with helical ribs projecting therefrom, the ribs of the screws meshing with one another, said ribs each being of trapezoidal cross section between outwardly diverging flanks.

2. The double-worm extruder defined in claim 1 wherein said flanks include angles $\alpha$ with radial planes of the respective screw of at most 5°.

3. The double-worm extruder defined in claim 2 wherein said angle $\alpha$ is at least 0.5°.

* * * * *